United States Patent
Dratner

(10) Patent No.: US 10,082,336 B2
(45) Date of Patent: Sep. 25, 2018

(54) COOLING ELEMENT FOR A MELTING FURNACE

(71) Applicant: KME GERMANY GMBH & CO. KG, Osnabrück (DE)

(72) Inventor: Christoph Dratner, Osnabrück (DE)

(73) Assignee: KME Germany GmbH & Co. KG, Osnabrück (DE)

( * ) Notice: Subject to any disclaimer, the term of this patent is extended or adjusted under 35 U.S.C. 154(b) by 205 days.

(21) Appl. No.: 14/414,035

(22) PCT Filed: May 6, 2013

(86) PCT No.: PCT/DE2013/000248
§ 371 (c)(1),
(2) Date: Jan. 9, 2015

(87) PCT Pub. No.: WO2014/008877
PCT Pub. Date: Jan. 16, 2014

(65) Prior Publication Data
US 2015/0211795 A1    Jul. 30, 2015

(30) Foreign Application Priority Data

Jul. 9, 2012    (DE) .................. 10 2012 013 494

(51) Int. Cl.
  *F28F 3/12*    (2006.01)
  *F27D 1/12*    (2006.01)
  (Continued)

(52) U.S. Cl.
  CPC ............... *F27D 1/12* (2013.01); *B23P 15/26* (2013.01); *C21B 7/10* (2013.01); *F27B 1/24* (2013.01);
  (Continued)

(58) Field of Classification Search
  CPC ............... F27D 1/12; F27D 2009/0048; F27D 2009/0062; F27D 2009/0029; F27B 1/24; B23P 15/26; C21B 7/10
  See application file for complete search history.

(56) References Cited

U.S. PATENT DOCUMENTS 3,628,509 A    12/1971   Becker et al.
4,029,053 A  *  6/1977   Higuchi .................... C21B 7/10
                                                    122/6.5
(Continued)

FOREIGN PATENT DOCUMENTS

DE    2120444    6/1971
DE    2907511    9/1980
(Continued)

OTHER PUBLICATIONS

"Thermal Conductivity", http://hyperphysics.phy-astr.gsu.edu/hbase/Tables/thrcn.html https://web.archive.org/web/20011128015225/http://hyperphysics.phy-astr.gsu.edu/hbase/Tables/thrcn.html Nov. 28, 2001.*

(Continued)

*Primary Examiner* — Len Tran
*Assistant Examiner* — Jon T Schermerhorn
(74) *Attorney, Agent, or Firm* — Henry M. Feiereisen LLC

(57) ABSTRACT

A cooling element for a melting furnace includes at least one cooling pipe for passing through a coolant, and a support element to which the at least one cooling pipe is fastened. At least one cove plate is welded to the at least one cooling pipe. The at least one cooling pipe has at least one bead which extends in the longitudinal direction of the at least one cooling pipe and to which the at least one cover plate is welded.

13 Claims, 3 Drawing Sheets

(51) Int. Cl.
*C21B 7/10* (2006.01)
*F27B 1/24* (2006.01)
*F27D 9/00* (2006.01)
*B23P 15/26* (2006.01)

(52) U.S. Cl.
CPC ............... *F27D 9/00* (2013.01); *F28F 3/12* (2013.01); *F27D 2009/0029* (2013.01); *F27D 2009/0048* (2013.01); *F27D 2009/0062* (2013.01); *Y10T 29/49359* (2015.01)

(56) References Cited

U.S. PATENT DOCUMENTS

| | | | | |
|---|---|---|---|---|
| 4,192,258 A * | 3/1980 | Touze | ................ | C21B 7/10 122/6.5 |
| 4,245,982 A * | 1/1981 | Radoux | ................ | C21B 7/10 122/6 B |
| 4,382,585 A | 5/1983 | Fischer et al. | | |
| 4,487,400 A * | 12/1984 | Gheen | ................ | C21B 7/10 122/6 A |
| 5,058,534 A * | 10/1991 | Pohl | ................ | C21B 7/10 122/6 A |
| 6,415,811 B1 * | 7/2002 | Irnich | ................ | C21B 9/12 137/340 |
| 2004/0194940 A1 * | 10/2004 | Manasek | ................ | C21C 5/40 165/168 |
| 2004/1194940 | 10/2004 | Manasek et al. | | |
| 2012/0043065 A1 * | 2/2012 | Ranne | ................ | F27B 1/24 165/172 |
| 2013/0126138 A1 | 5/2013 | Seo et al. | | |

FOREIGN PATENT DOCUMENTS

| | | |
|---|---|---|
| DE | 4035894 | 1/1992 |
| EP | 2145719 | 1/2010 |
| JP | H06234079 | 8/1994 |
| JP | 2003329371 | 11/2003 |
| JP | 2010-156511 | 7/2010 |
| KR | 20100008080 | 1/2010 |
| KR | 20110120600 | 11/2011 |
| WO | WO2010/128197 | 9/2013 |
| WO | WO2013/135221 | 9/2013 |

OTHER PUBLICATIONS

International Search Report issued by the European Patent Office in International Application PCT/DE2013/000248.

* cited by examiner

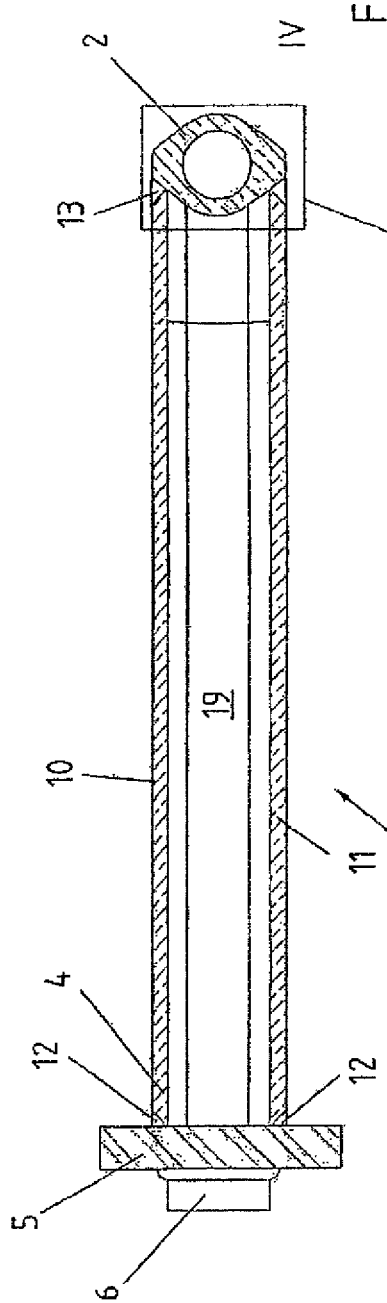
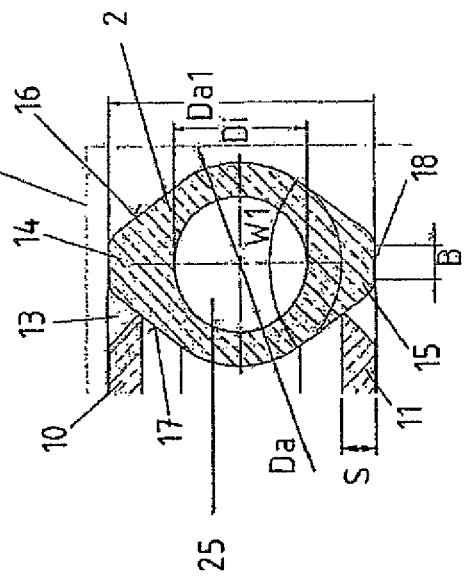

COOLING ELEMENT FOR A MELTING FURNACE

CROSS-REFERENCES TO RELATED APPLICATIONS

This application is the U.S. National Stage of International Application No. PCT/DE2013/000248, filed May 6, 2013, which designated the United States and has been published as International Publication No. WO 2014/008877 and which claims the priority of German Patent Application, Serial No. 10 2012 013 494.0, filed Jul. 9, 2012, pursuant to 35 U.S.C. 119(a)-(d).

BACKGROUND OF THE INVENTION

The invention refers to a cooling element for a melting furnace with at least one cooling pipe for the passage of a cooling agent, and a support element to which the cooling pipe is fastened and wherein the at least one cooling pipe is welded together with a cover plate.

Melting furnaces usually consist of a container made from steel. For protection of the steel container, water cooled elements are fixed interiorly at the wall of the container. The space between the water-cooled elements are filled with fireproof material, for example, with pre-formed stones or also with a cast mass. The surface in front of the cooling elements is also covered in this manner.

The prior art of water-cooled cooling elements are roughly categorized into two alternatives. On the one hand, there are flat cooling elements, which essentially cover the complete inner wall of the furnace. These cooling elements are usually from copper and consist of a hot forged micro structure and are deep-bored for the passage of cooling water. Elements of grey-cast iron with pipes cast therein are also known. Cooling elements of this construction type are commonly referred to as stave coolers. (DE 29 07 511 C2).

On the other hand, there are special cooling elements that are also referred to a cooling boxes. Such cooling boxes are usually produced from copper mold casting (sand casting). They do not cover the furnace wall completely, only partially. They are pushed through a mostly rectangular or oval opening from the exterior into the furnace shell, from which they can be pulled out again from the outside in case of a necessary repair. For this purpose, these elements usually taper trapezoidally toward the furnace interior (DE 40 35 894 C1, WO 2010/128197 A1). In comparison thereto, stave coolers can only be constructed in the furnace interior, thus requiring a stoppage of the furnace.

The cooling elements that are installed from exterior are usually provided with one or two cooling channels that extend independent of each other. The cooling elements are welded into the furnace tank in a gastight manner. Since copper and steel can be welded together only with great effort, the copper elements are provided with a steel cuff in the area of the wall opening. Alternatively, an end plate can be provided. For example, a mounting lug can be welded to the end plate in order to simplify pulling the element out from the furnace wall.

Cast copper cooling elements which cannot be any longer subject to hot forming because of operational condition, due to their course grain structure, are susceptible to cracking at thermic cycling. This can lead to water emission into the melting furnace. The defective circulation must be halted and the defective element removed on short notice. A further disadvantage when utilizing cast copper cooling elements is the occurrence of shrinkage cavities in the sand casting process.

For the foregoing reasons, in the following known prior art, the copper portion of the cooling element is produced from hot forged micro structure.

DE 40 35 894 C1 describes a cooling element that consists of one or more bent pipes where the pipes are explosively welded together with a bottom and a cover plate. In this process, the pipe and the cover plate are shortly pressed together under high pressure such that the components fuse with each other at their grain boundaries.

WO 2010/128197 A1 describes an embodiment of a cooling elements from cooling pipes without a bottom and a cover plate. The special feature of this embodiment is that, in order to simplify the construction, the cooling pipes are trapezoidally formed, at least in vertical direction. The area around the pipe bottom is filled with fireproof materials. This has however the disadvantage that the heat transfer resistance is relatively high. As compared to the cooling element of DE 40 35 894 C1, only the surface has a low heat transfer resistance, however not the interior area filled with the fireproof mass. That has a considerable lower conductivity than the copper portion and is thus unable to take on the cooling function. The main task for the cooling elements, to protect the furnace shell from the heat radiation of the melting process, is carried out in only unsatisfactory manner.

Even the example described in DE 40 35 984 C1 of a cooling box exhibits disadvantages since the explosive joining of the cover plate with the cooling pipes, no fusion takes place and the heat transfer is thus negatively affected.

Starting from there, the object of the present invention is to avoid the foregoing disadvantages and to provide a cooling element where the heat transfer resistance is reduced. Furthermore, a process for the production of such a cooling element is provided.

According to one aspect of the invention, the object is solved with a cooling element having at least one cooling pipe for passage of a coolant, and a support element at which the at least one cooling element is fixed, wherein the at least one cooling element is welded together with the at least one cover plate, wherein the at least one cooling pipe is provided with at least one bead extending in longitudinal direction of the at least one cooling pipe which is welded together with the at least one cover plate.

According to another aspect of the invention, the object is solved by a process in which at least one cooling pipe is produced from a bar which exhibits in a cross section at least one bead along the longitudinal direction of the bar, wherein a channel for a coolant extends in longitudinal direction is produced through boring.

Advantageous developments of the invention are subject of the respective dependent claims.

The cooling element according to the present invention for a melting furnace especially a blast furnace includes at least one cooling pipe with a cooling agent channel for passing a cooling agent. The cooling agent is usually water. The cooling element further includes a support element at which the at least one cooling pipe is fastened. In addition, the cooling pipe is welded together with at least one cover plate.

In accordance with the present invention, the at least one cooling pipe has a bead extending in longitudinal direction with which the at least one cover plate is welded together. The cooling pipe has a special shape profile which permits welding the cover plate together with the cooling pipe in a special manner. Welding the cover plate to the cooling pipe results in retaining the micro structure in the area of the pipe wall of the cooling pipe. There is no weakening of the material in the area of the pipe wall due to the shift of the heat affected zone of the welding process.

In addition, the welding seam that results from the welding process can be made more durable and more secure at an even surface of the bead as compared to the rounded surface of the pipe.

The technical design of the cooling element according to the present invention thus attains an optimization of the production process in that an explosive welding can be foregone.

Welding according to the present invention is fusion welding whereby the two components to be welded together are joined by melting in the area of the welding seam, optionally in the presence of a welding material.

If the cooling pipe exhibits has only a single bead, it means that there is only a single thickening extending in longitudinal direction of the cooling pipe, wherein the thickening in form of a bead has the exclusive function to serve as welding partner for the cover plate.

Within the framework of the invention, the cooling pipe may also have two beads such that cover plates disposed opposite each other can be welded with the beads. The beads are thus disposed facing each other.

In a preferred variant, the cover plate is from copper or a copper alloy so that the welding process is not based on entirely different materials such as the pairing of copper-steel. Thus, in accordance with the present invention cooling pipes from copper or a copper alloy with cover plates from copper or copper material are welded together.

A further advantage of the cooling element according to the present invention is that not only the cover plate is involved in the heat transfer but also the bead which abuts the respective cover plate. The bead also serves to enlarge the surface of the cooling element that participates in the heat transfer.

Within the frame work of the present invention the at least one cover plate may be welded together with the bead of an outer cooling pipe and spanning across an inner cooling pipe adjacent to the outer cooling pipe. This means that the cooling element includes at least two cooling pipes, namely an outer and at least an inner cooling pipe. The inner cooling pipe contributes additionally to cooling the cover plate, so that the total cooling output is increased.

Preferably, the inner cooling pipe also has a bead so that the cover plate is constructed in two pieces. A first part of the cover plate is being welded between the two beads substantially extending parallel to each other of the inner and other cooling pipes. An inner part of the cover plate is welded exclusively with the bead of the inner pipe. In that case the bead of the inner pipe does not span across the cover plate, but projects between the adjoining first and second parts of the cover plate, such that the bead is directly involved with the heat transfer and again contributes to the enlargement of the surface of the cooling element. The heat will be introduced directly into the welded cover plate via the welding seams. The welding seams also enlarge the outer surface of the cooling element and contribute to the heat transfer.

It is particularly advantageous if the at least one bead is formed in substantially trapezoidal shape. Trapezoidal in this context means that the bead includes two flanks that are arranged at an angle to each other and that preferably merge tangentially into the rounded outer surface of the cooling pipe. The two flanks though do not meet into a point, but section an upper, or, in reference to the front surface, an outer front surface, of a trapeze. The broader base of the trapeze is formed by the rounded pipe wall. The shorter, outer front surface of the trapeze is located after the welding of the cover plate preferably, at least partially in the same plane as the outer surface of the cover plate. The advantage of the trapezoidal form, and in particular the slightly inclined flanks, is that a V-seam which is favorable for welding can be realized. If not only the side flank of the bead is inclined but simultaneously the to be welded to cover plate has been beveled, an ideal weld preparation results.

Advantageously, the cover plates are not in back of the respective cover plate. It should be avoided that the area surrounding the cooling pipe forms an undercut, as this would be very obstructive upon removal of the cooling element. It is thus possible, within the framework of the present invention, to arrange the cover plates in parallel disposition to each other but at a sufficiently sized distance. A slightly conical disposition of the cover plates can be also contemplated. This means, that the cover plates in direction of the insertion of the cooling element are at an angle relative to each other. At least one of the cover plates is thus disposed at an angle relative to the direction of insertion. The oppositely located cover plate can be arranged parallel to the direction of insertion. At least one of the cover plates is thus disposed tilted at an angle of up to 5° relative to the direction of insertion. Preferably, an outer surface of the cover plate is at least partially in the same plane as one of the flanks of the end surface of the at least one trapezoidal bead but not in back of the end surface. The cover plates are preferably formed as level plates. It is within the framework of the present invention also possible to utilize cover plates that are curved or, at least in view of the outer surface of the cooling element, extend without an undercut so that the cooling element can be easily pulled from the melting furnace.

The process of the present invention for producing such a cooling element provides that the at least one cooling pipe is produced from a drawn hollow profile of copper or a copper alloy.

Additionally, the hollow profile can be calibrated through pressing.

Drawn hollow profiles can be produced cost effective and wherein in addition substantially any form of the bead can be realized.

It is also contemplated that in an alternative embodiment the at least one cooling pipe is produced from a bar with a cross section showing at least one bead extending along the length of the bar, wherein a channel for the cooling agent is bored along the length of the bar. While the interior hollow space in drawn hollow profiles is easier to produce than through boring, the boring is carried out with great precision on relatively soft copper materials with high forward feed at high speed. Thereafter, the lengthwise bored bars or drawn hollow profiles are bent into the desired shape.

The welding of the at least one cooling pipe together with the cover plate can be carried through a process of arc-welding. Likewise, friction welding is a suitable process to connect the cover plate with the at least one cooling pipe. In addition, electron-beam welding can be applied.

The cover plate can be welded between the beads of adjacent sections of the cooling pipe depending on the welding process. It is also contemplated that several cooling pipes that are extending substantially parallel to each other, to weld the cover plate with only one bead of the outer cooling pipe spanning an inner cooling pipe adjacent to the outer cooling pipe.

The empty space between the cover plates opposite each other can be filled with a mass of fireproof material.

The substantial advantage of the present invention is that the cover plates are welded together with the beads without the welding process, respectively, the thermal impact zone accompanying the welding process weakening the structure in the area of the wall thickness of the pipe. A further advantage is that the cover plates are also being directly cooled via the resulting welding seams.

BRIEF DESCRIPTION OF THE DRAWING

The invention will now be described with reference to exemplary embodiments schematically illustrated in the drawings, which show in:

FIG. 4 a section view along the line IV-IV in FIG. 2;

FIG. 5 an enlarged view of the detail V of FIG. 4;

DETAILED DESCRIPTION OF PREFERRED EMBODIMENTS

Figure 1:
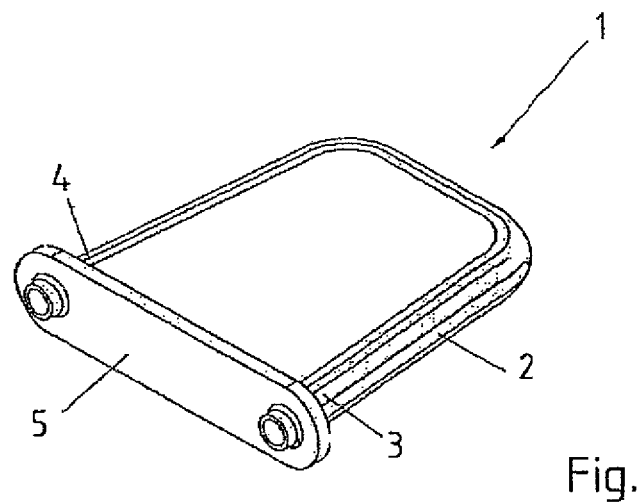
FIG. 1 a perspective view of a first embodiment of a cooling element.

FIG. 1 shows a cooling element 1 which is designed for insertion in the wall of a melting furnace. The cooling element 1 includes a U-shaped cooling pipe 2, which penetrates the furnace shell in a manner not shown here, projecting into the interior of the furnace. The cooling pipe 2 has two ends 3, 4 which are connected with a joint plate-shaped support element 5. From FIGS. 2 and 3 it is seen that end 3 of cooling pipe 2 does not penetrate support element 5, but is solely fastened at an opening of support 5. In the opening of support 5 a connector piece 6 is fastened by welding. The connector piece 6 serves as coupling with additional line sections not shown here in detail.

In this embodiment the connector pieces 6 are from steel, whereas the cooling pipe 2 is from a copper material. First, the connector piece 6 is connected with the cooling pipe 2 by a welding technique. This can be preferably done by means of friction welding, because friction welding allows in especially simple manner, the production of pairing different work materials. The connector piece 6 that is connected in such a manner with the cooling pipe 2 is inserted through the opening in support element 5. The support element 5 itself is also from steel so that the connector piece 6 can be welded via the indicated welding seam to the support element 5 at the side facing away from the cooling pipe in a production technologically simple efficient manner. Here, the material pairing is steel-steel. Alternatively, it is possible not to produce the connector piece 6 as a separate component, but to guide the cooling pipe 2 completely there through the opening of support element 5. In that case, the connector piece 6 would be materially a unitary part of the cooling pipe 2 and welded together with the support element 5 via a welding process.

Figure 2:
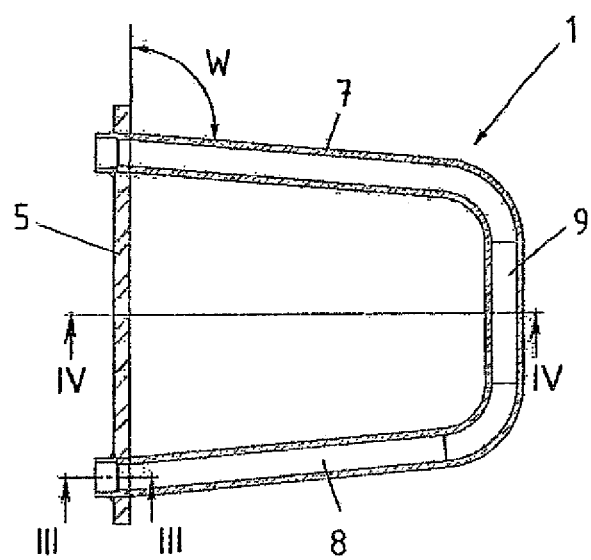
FIG. 2 a horizontal section view of the cooling element of FIG. 1.

FIG. 2 shows a longitudinal section view through cooling element 1, wherein the U-shaped cooling pipe 2 includes two legs 7, 8 that are each oriented in an angle W relative to the support element 5. The angle W between each of the legs 7 and the support element 5 are in a range larger than 90° and 97° and is in particular 95°. Therefore, the cooling element has a conical shape and can be thus more easily mounted or removed.

The two legs 7, 8 of cooling pipe 2 end in a base section 9 of cooling pipe 2, which extends, distant from the support element 5, and parallel to the support element 5. The transitions between the legs 7, 8 and the base section 9 are curved.

FIG. 4 shows that between the cooling pipe 2 and the support element 5, cover plates 10, 11 are disposed. The cover plates 10, 11 can be designated as upper and lower cover plate and extend in this embodiment parallel to each other. The cover plates 10, 11 are welded together with the end plate 5, or with the cooling pipe 2, seen by the welding seams 12, 13 that extend at the upper cover plate 10, identical to the lower cover plate 11.

The enlarged detail of FIG. 5 shows that the cross section of cooling pipe 2 is not circular but shows beads 14, 15 that are diametrically arranged at opposite sides of a longitudinal axis of the cooling pipe. In the drawing plane, the beads 14, 15 are seen pointing upwards respectively downwards and are thus facing away from the connecting plate 5. The beads 14, 15 cross sections are configured in trapezoidal shape. The beads 14, 15 enlarge the wall thickness in the area of the beads. FIG. 5 shows that the inner diameter Di of the coolant channel 25, in this embodiment, remains constant at 40 mm across the entire circumference. The outer diameter Da in the cylindrical area of the cooling pipe 2 also constant and in this embodiment is 60 mm. The wall thickness in the cylindrical area is also constant and increases in the area of the beads 14, 15 to about twofold. This means, the outer diameter Da1 in the area of the beads 14, 15 is about 80 mm. The trapezoidal-shaped beads 14, 15 have two legs 16, 17 that extend tangentially from the cylindrical area of the cooling pipe 2 to an end of the bead 14, 15 which forms an outer surface of the cooling pipe 2. One of the beads 14 narrows along a first direction extending radially outwards from the longitudinal axis and the other of the beads 15 narrows along a second direction extending radially outward from the longitudinal axis, with the first direction being opposite to the second direction.

Due to the considerable measurements of beads 14, 15, the welding seam 13 is not in the contact area of the cylindrical circumferential section of the cooling pipe 2, but exclusively in contact with beads 14, 15. The legs 16, 17 are oriented at about an angle W1 of 70° to 75° relative to each other.

The thickness S of cover plate 10, 11 corresponds approximately to the thickness of the pipe wall of cooling pipe 2, about 10 mm. It is shown that the welding seam 13 extends in V-shape and not project either upwardly nor downwardly or not substantially beyond the height of beads 14, 15. Likewise, cover plates 10, 11, due to the disposition of the welding seam 13 next to beads 14, 15, do not project beyond the height of these, so that the cover plates 10, 11 are quasi located in the interior space spanned by the cooling pipe and cover plate 5. The interior space 19 additionally can be filled up with fireproof material.

Figure 3:
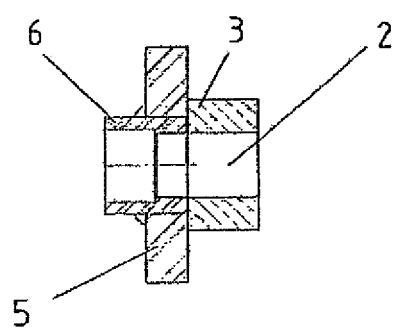
FIG. 3 a section view along the line III-III in FIG. 2.
Figure 6:
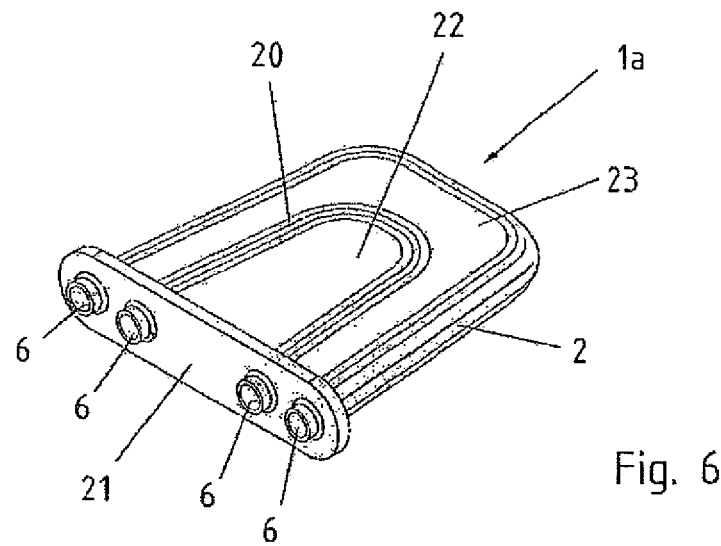
FIG. 6 a perspective view of a further embodiment of a cooling element.
Figure 7:
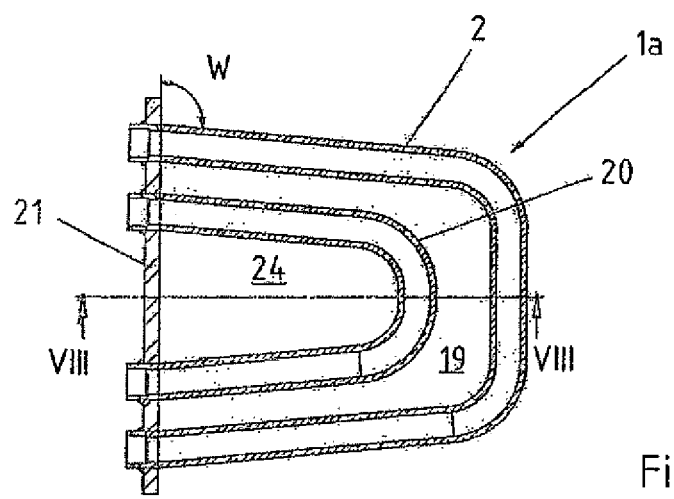
FIG. 7 the cooling element of FIG. 6 in a horizontal section view.
Figure 8:
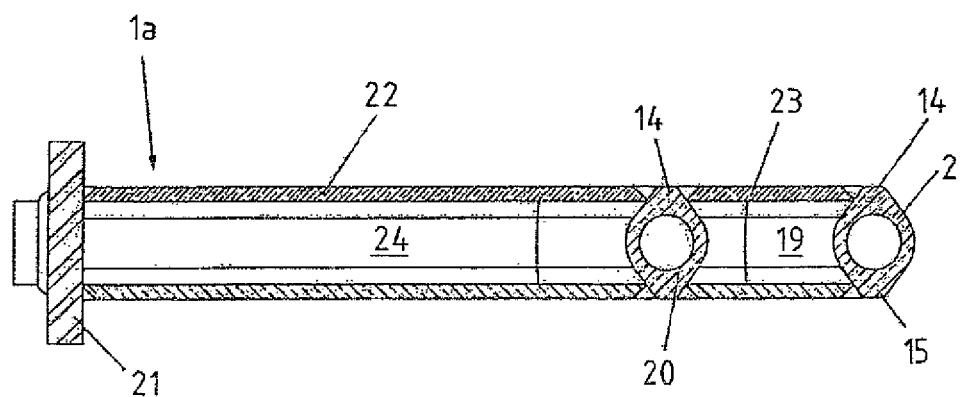
FIG. 8 a cross section of the cooling element of FIG. 6 according to line VIII-VIII in FIG. 7.

The embodiment of FIGS. 6 to 8 differs from the one in FIGS. 1 to 5 in that in addition to the outer cooling pipe 2, a further cooling pipe 20 is provided. The second cooling pipe 20 is located in the interior space 19 which is spanned by the first cooling pipe 2 with the support element 21. The second cooling pipe 22 has the same cross sectional configuration so that the description in relation to FIG. 5 is referred to. The second cooling pipe 20 extends at a distance to the first cooling pipe 2, and substantially parallel to the first cooling pipe. So it is also configured in a U-shape wherein the ends are again fastened at the joint support element 21. FIG. 6 shows that a total of four identically configured connector pieces 6 are disposed in the support element 21. The description regarding FIG. 3 is referred to in this regard.

As compared to the first embodiment, the second variant has a two-piece cover plate, hereafter referred to as inner and outer cover plate 22, 23. The inner cover plate 22 spans an interior space 24 which is surrounded by inner cooling pipe 20. The outer cover plate 22 is approximately U-shaped and extends between the two adjoining cooling pipes 2, 20. Each of the cover plates 22, 23 are located identically at the upper- and lower surfaces of the cooling element 1a and are fastened in the same manner as referred to with respect to FIG. 5. The cover plate 23 is now however welded together with two cooling pipes 2, 20 and not with just one cooling pipe 2 as in embodiment of FIG. 1.

The invention claimed is:

1. A cooling element for a melting surface, comprising:
   at least one cooling pipe for passage of a coolant, said cooling pipe provided with two oppositely disposed identical beads extending in a longitudinal direction of the cooling pipe and located diametrically at opposite sides of a longitudinal axis of the cooling pipe;
   a plate-shaped support element at which the cooling pipe is fastened via each of two leg ends of the cooling pipe; and
   cover plates, each oppositely disposed relative to the cooling pipe,
   wherein each of the cover plates is welded together with one of the oppositely disposed beads of the cooling pipe,
   wherein the cover plates are made from copper or a copper alloy,
   wherein each of the two beads has a cross section with a trapezoidal shape, and each of the beads has two legs which extend tangentially from a cylindrical area of the cooling pipe to an end of the bead which forms an outer surface of the cooling pipe, and
   wherein one of the beads narrows along a first direction extending radially outward from the longitudinal axis and the other of the beads narrows along a second direction extending radially outward from the longitudinal axis, the first direction being opposite to the second direction.

2. The cooling element of claim 1, further comprising a second cooling pipe oriented adjacent to the at least one cooling pipe, wherein each of the cover plates are welded together with the respective beads of the at least one cooling pipe spanning across the second cooling pipe.

3. The cooling element of claim 1, wherein the beads exhibit a thickness in a radial direction relative to the cooling pipe, said thickness corresponds to a thickness of the welded to cover plates.

4. The cooling element of claim 1, wherein each of the beads has a trapezoidal cross section and a flank, said cover plates being welded to the flanks of the beads.

5. The cooling element of claim 4, wherein each of the cover plates has an outer surface which is at least partially located in a same plane as an end surface which is bordered by the flanks of a corresponding one of the trapezoidally shaped beads.

6. A process for producing a cooling element according to claim 1, said process comprising the step of producing the at least one cooling pipe from a hollow profile drawn from copper of a copper alloy.

7. A process for producing a cooling element for a melting furnace, comprising the steps of:
   providing a blank metal bar with beads extending along a longitudinal extension of the metal bar;
   boring lengthwise through the blank metal bar to form a channel for allowing passage of a coolant and to produce a cooling pipe, said cooling pipe provided with two oppositely disposed identical beads extending in a longitudinal direction of the cooling pipe and located diametrically at opposite sides of a longitudinal axis of the cooling pipe;
   providing a plate-shaped support element at which the cooling pipe is fastened via each of two leg ends of the cooling pipe; and
   providing cover plates, each oppositely disposed relative to the cooling pipe, wherein each of the cover plates is welded together with one of the oppositely disposed beads of the cooling pipe,
   wherein the cover plates are made from copper or a copper alloy, and
   wherein each of the two beads has a cross section with a trapezoidal shape, and each of the beads has two legs which extend tangentially from a cylindrical area of the cooling pipe to an end of the bead which forms an outer surface of the cooling pipe, and
   wherein one of the beads narrows along a first direction extending radially outward from the longitudinal axis and the other of the beads narrows along a second direction extending radially outward from the longitudinal axis, the first direction being opposite to the second direction.

8. The process of claim 7, further comprising joining a cover plate to the cooling pipe by a welding process.

9. The process of claim 8, wherein the cover plate is joined to the cooling pipe by arc welding.

10. The process of claim 8, wherein the cover plate is joined to the cooling pipe by friction welding.

11. The process of claim 7, wherein the cover plate is joined to the cooling pipe by electron-beam welding.

12. The process of claim 8, wherein the cover plate is welded between the beads of adjacent cooling pipes.

13. The process of claim 12, wherein the adjacent cooling pipes are arranged to define an outer cooling pipe and an inner cooling pipe, wherein the cover plate is welded to a bead of the outer cooling pipe and sized to span across the inner cooling pipe.

* * * * *